(12) United States Patent
Bruet-Ferreol

(10) Patent No.: US 7,055,687 B2
(45) Date of Patent: Jun. 6, 2006

(54) CASES FOR ONE OR SEVERAL LASER DISCS AND MEANS FOR CLASSIFYING SAME

(76) Inventor: Jean-Denis Bruet-Ferreol, 41, boulevard du Montparnasse, Paris F-75006 (FR)

( * ) Notice: Subject to any disclaimer, the term of this patent is extended or adjusted under 35 U.S.C. 154(b) by 0 days.

(21) Appl. No.: 10/362,734

(22) PCT Filed: May 27, 2002

(86) PCT No.: PCT/FR02/01763

§ 371 (c)(1),
(2), (4) Date: Aug. 7, 2003

(87) PCT Pub. No.: WO02/097819

PCT Pub. Date: Dec. 5, 2002

(65) Prior Publication Data

US 2004/0026274 A1    Feb. 12, 2004

(30) Foreign Application Priority Data

May 29, 2001 (FR) .................................. 01 06963

(51) Int. Cl.
*B65D 85/57* (2006.01)
(52) U.S. Cl. ................................ 206/308.01
(58) Field of Classification Search ............... 206/308.1
See application file for complete search history.

(56) References Cited

U.S. PATENT DOCUMENTS

| 5,299,186 | A | * | 3/1994 | Tsurushima | ............... | 206/308.1 |
|---|---|---|---|---|---|---|
| 5,533,614 | A | | 7/1996 | Walker | | |
| 5,651,458 | A | * | 7/1997 | Brosmith et al. | ........ | 206/308.1 |
| 5,685,425 | A | | 11/1997 | Choi | | |
| 5,823,334 | A | | 10/1998 | Giovanni | | |
| 5,855,273 | A | | 1/1999 | Grobecker et al. | | |
| 5,944,181 | A | | 8/1999 | Lau | | |
| 6,041,946 | A | | 3/2000 | Watson et al. | | |
| 6,164,445 | A | | 12/2000 | Cooper | | |
| 6,364,102 | B1 | * | 4/2002 | Gordon et al. | ............... | 206/217 |
| 6,557,698 | B1 | * | 5/2003 | Gordon et al. | ............... | 206/217 |
| 6,568,526 | B1 | * | 5/2003 | Reinhardt et al. | .......... | 206/310 |
| 6,571,944 | B1 | * | 6/2003 | Ku | .......................... | 206/308.1 |
| 6,752,266 | B1 | * | 6/2004 | Ku | .......................... | 206/308.1 |
| 6,779,659 | B1 | * | 8/2004 | Marsilio et al. | ......... | 206/308.1 |
| 6,808,065 | B1 | * | 10/2004 | Chang | ..................... | 206/308.1 |

* cited by examiner

*Primary Examiner*—John A. Ricci
(74) *Attorney, Agent, or Firm*—Oblon, Spivak, McClelland, Maier & Neustadt, P.C.

(57) ABSTRACT

Case or cases for one or several laser discs, designed to protect solely the recorded side of one or several CDs to be housed either against at least a wall against which they are elastically clipped on a centering element internally, or externally. When the case houses two CD's on a single centering element, the recorded side of the CDs is pressed one against the other with or without interleaf. The case can receive and immobilize, additionally to a CD, a tag bearing complementary data concerning the CD, transparently seen through the wall against which is pressed the recorded side of the CD to be housed and protected, by a conical inner surface retaining the tag through the base of a cone, and whereof the outside is square, hexagonal, or octagonal. The case is preferably made of a relatively flexible transparent plastic material. The disc is unclipped by pressing the thumb on the middle of the centering element while simultaneously exerting a flexure with the tip of the finger on the rear side of the periphery of the case.

22 Claims, 7 Drawing Sheets

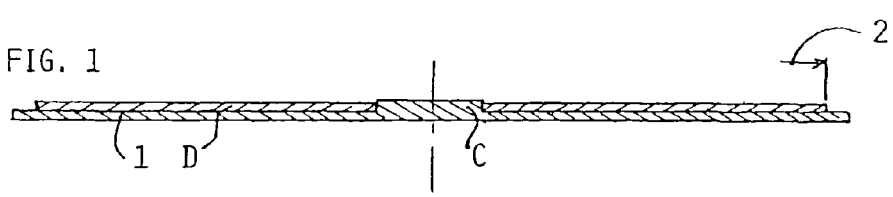
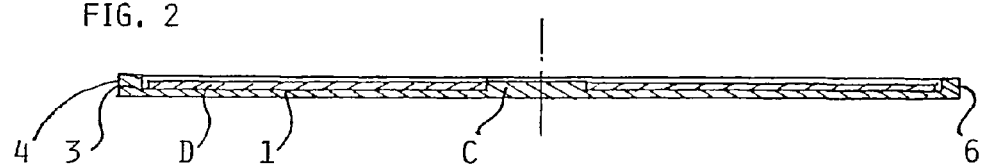
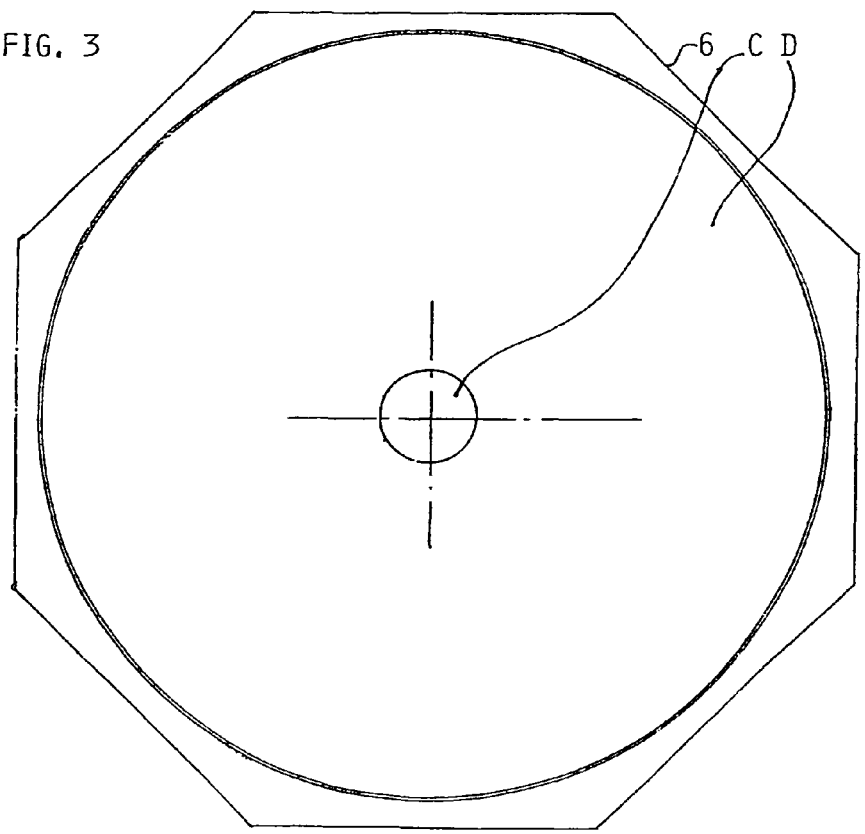
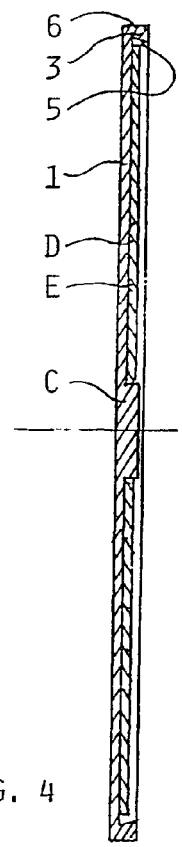
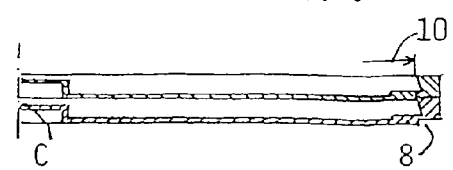

FIG. 7
FI. 8
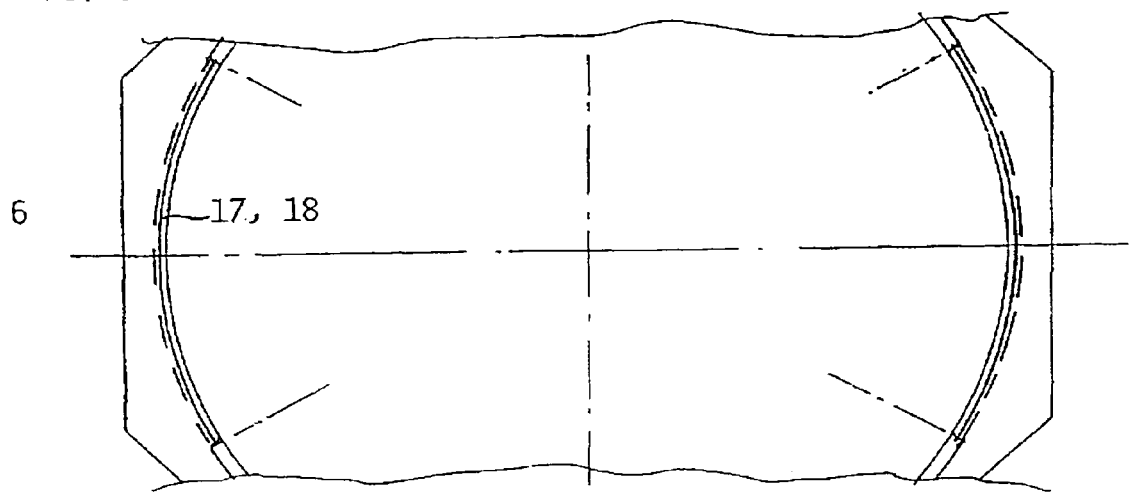
FIG. 9
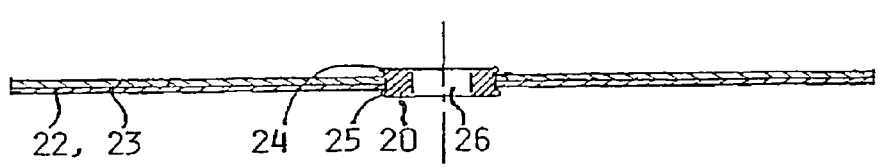
FIG. 10
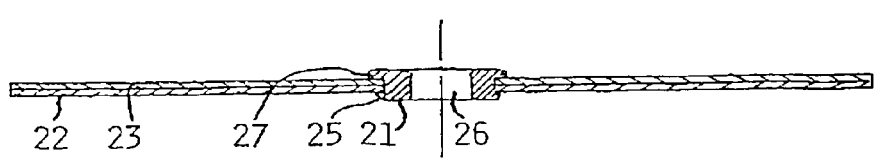
FIG. 11
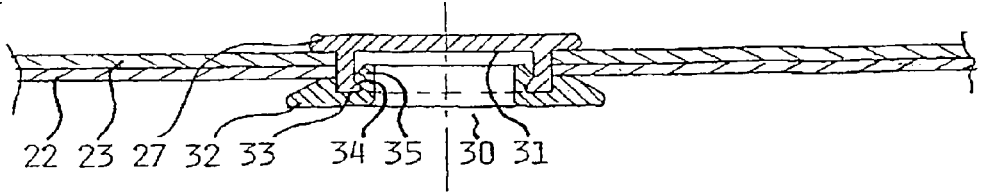

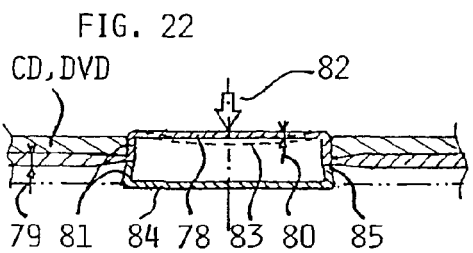
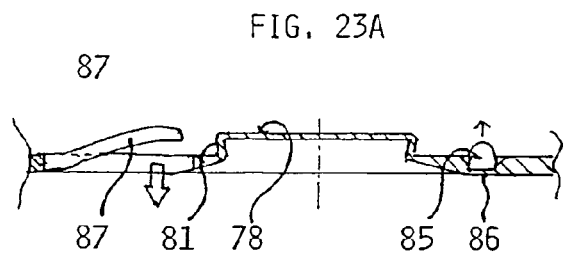
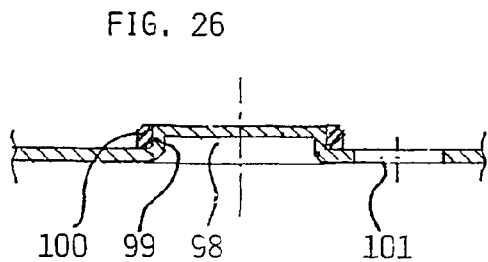
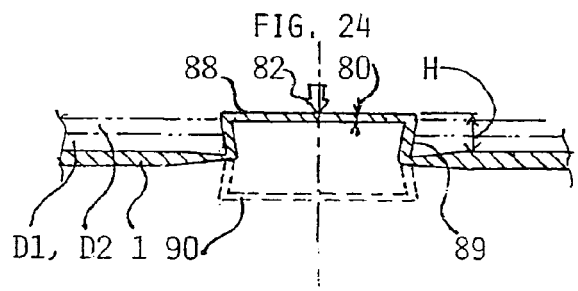
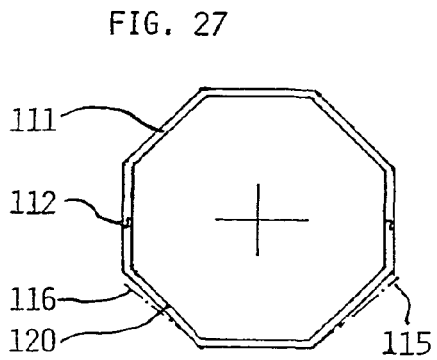
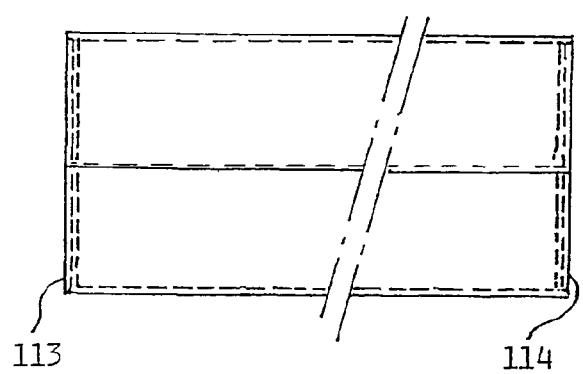
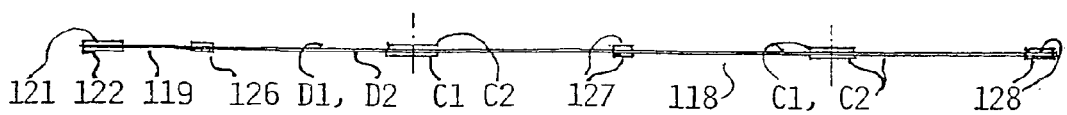
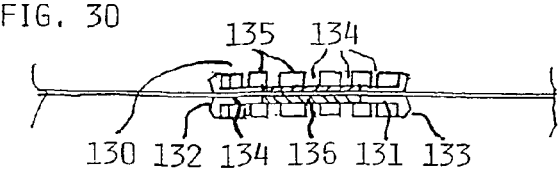

CASES FOR ONE OR SEVERAL LASER DISCS AND MEANS FOR CLASSIFYING SAME

The invention relates to cases for single and multiple laser disks ("compact disk, audio CD, CDR, CDRW, CD ROM, DVD") and means for organizing such disks, which are referred to hereinafter as CDs.

There are already known CD boxes and similar devices made of rigid plastic material of the polycarbonate type to house from one to three CDs. These boxes for recorded audio CDs, CD ROMs and DVDs comprise a box with a pivoted cover. Some versions are several mm thick, with an attached piece embedded in the box, while thinner versions with a thickness of about 3 mm comprise merely a box and a cover intended to house and center the CD.

They suffer from the following disadvantages:
fragility of the hinge, fragility of the teeth for centering the CD, fragility of the faces of the box; these various elements breaking easily during handling;
complexity of the three component parts to be manufactured and assembled for the thickest versions;
considerable bulkiness of the box, ranging from thicknesses of 10 mm for the most common to 3 mm for the thinnest, compared with the thickness of the CD, which is about 1 mm, thus requiring large widths for organization in upright orientation and preventing any other type of organization;
considerable weight of the box compared with that of the CD to be protected;
handling complexity and difficulties due to the snap-on cover, so that they are neither practical nor rapid for access to the CD, all the more so in the case of double CDs;
the current organizers are cumbersome and not very practical; the CDs must be introduced into unclosed sleeves, from which they can slip out during handling of pages, their accessibility is poor and the recorded face rubs against the corresponding surface of the sleeve;
the zipper closure of these organizers is not very manageable after it has been opened, because it must spread apart to an angle sufficient to permit manipulation of the pages;
the boxes are cumbersome, poorly manageable and bulky; it is difficult to stack them vertically.

The problems to be solved to alleviate these various disadvantages are as follows:
to simplify the manipulations for access to the single or double CD and for replacement of same in their box, with one hand;
to protect adequately the recorded face of the CD or of double CDs;
to increase the mechanical strength of the box;
to reduce the bulkiness of the box in thickness, so that many more CDs can be stored in the same volume than is possible with existing boxes;
to reduce the bulkiness of double CD or DVD boxes in thickness while facilitating access thereto and storage of same after use;
to make the case lighter in order to reduce mailing costs;
to be able to stock and organized large numbers of CDs in a storage means that is not very bulky and is easy to handle and transport;
to reduce the manufacturing cost;
to be able to store large numbers of disks in boxes and organizers having separate trays, without exerting friction on the support tray and without the risk that disks will slide out of the organizer during handling, remaining very easily accessible.

The inventive laser disk cases solve all of the stated problems. As regards the stated problem, it was recognized that only the recorded face of the CDs has to be protected, while the other face has no such need.

A first and simplest version of the inventive case, for housing a single CD, reduces to one thin wall provided with a centering means onto which the CD is snapped by its central hole, the CD face to be protected being placed against the corresponding surface of the case.

In a second version to permit the cases to be stacked or to be stored in upright orientation on shelves or in the boxes, there has been provided a peripheral external shoulder on the wall of the case, whose internal face, which is conical or provided with pins, is capable of retaining a cardboard label engaged elastically in the cone retaining it, the recorded face of the CD being braced against the label, which can be read through the transparent wall of the case, the other face, containing information, remaining readable directly by virtue of the absence of a cover. To make the case lighter, the outer shape of the shoulder is octagonal, ensuring that it is stably braced in upright orientation. The case is made of semi-rigid transparent plastic material, which can easily deform by being flexed and which is not sensitive to impacts. The multiple-CD versions of the inventive cases are derived directly from the simple case.

In a third version of the two-CD case, the centering means of the case is designed such that two CDs can be snapped on with their recorded faces against one another, with or without intermediate tray. Their centering means is designed such that both of these CDs can be snapped on simultaneously, the thickness of the centering means being less than that of the case wall in order to make it more "elastic", while the bearing surface for snapping on the CDs is slightly conical and has an introductory chamfer.

According to a fourth version of the CD cases, their wall is provided with one centering means on one side and one centering means on the other side, each housing one CD, and their periphery is provided with a shoulder disposed on both sides of the said wall, whose external shape is square, hexagonal or octagonal.

According to a fifth version of the CD cases, for housing two CDs with their recorded faces against one another with or without intermediate member, the CDs are centered and held in place by the outer periphery of the diameter of the CDs, on an internal bearing surface bounded either by two projections, which may have divided structure, or by one projection and one stop.

According to a sixth version of the CD cases, they are each designed to house, fix in position and protect two CDs with their recorded faces against one another, with or without intermediate member, engaged by their central hole on an elastically deformable, annular fixation hub, provided either with two retaining projections or with one projection and one stop.

According to a seventh version of the CD cases, they are each designed to house, fix in position and protect two CDs with their recorded faces against one another, with or without intermediate member, engaged by their central hole on an elastically deformable, annular fixation hub, comprising two parts snapped together by additional snap-on means; their hub is provided with a support foot for storage in upright orientation, the base of the foot having a width equal to that of an octagonal edge.

According to an eighth version of the CD cases, they are each made in two parts of hexagonal or octagonal shouldered outer shape with a conical bearing face to retain a label, in that these two parts are mutually pivoted by an integrally molded flexible joint and are kept closed together by pegs engaged in corresponding holes of the other part, the centering means, which are integral with the interior of their respective wall, each fixing one CD in position.

According to a ninth version of the CD cases, they are each made in two parts mutually pivoted by an integrally molded flexible joint, one part housing two CDs and the other housing a single CD and possibly a booklet, the two CDs being snapped onto the same centering means and the other being snapped onto a centering means for a single CD.

According to a tenth version of the CD cases, they are each made in two identical parts mutually pivoted by an integrally molded flexible joint, each housing two CDs, the CDs being snapped on in pairs, with recorded faces against one another, on a corresponding centering means.

According to an eleventh version of the CD cases, they are each made in two parts mutually pivoted by an integrally molded flexible joint, one housing two CDs snapped on with recorded faces against one another, on a corresponding centering means, while the other wall is not provided with a centering means, in order that it can house a booklet.

According to a twelfth version of the CD cases, they are each provided with a thin identification label of plastic material engaged in a groove cut in the side of one of the edges of the case, in that additional identification by CD families is provided in the form of rods of one, two or even three colors, engaged in a hole sunk partly into the side of face 6 of an edge of the case.

According to a thirteenth version of the CD cases, their centering means has a thickness of the bracing wall for the recorded face of the CD or DVD that is reduced by at least half, in that its snap-on shoulder is slightly conical to allow it to deform elastically during insertion of the CD.

According to a fourteenth version of the CD cases, their centering means is designed to house two CDs with their recorded faces against one another, its cone is longer and the thickness of its wall is reduced by half compared with that of the bracing wall. If the case houses one or two CDs on the other side of its wall, the second centering means is heat-sealed opposite the first.

According to a fifteenth version of the CD cases, their centering means is designed to house one CD, and it is made flexible by dividing up the surface of the snap-on cone by openings, while leaving a center on which the unsnapping pressure is exerted.

According to a sixteenth version of the CD cases, their centering means is provided with an elastomeric ring, which is attached by bonding to its shoulder and which has a diameter very slightly larger than that of the central hole of the CDs, so as to create a gentle retaining pressure thereon, in that ejection is achieved by pushing, through holes, on the rear of the bracing face of the CDs.

According to a seventeenth version of the CD cases, their centering-and-ejecting means is designed mainly to house a DVD laser disk wherein, in addition to the centering means, there are added elastically deformable ejection means intended to raise the CD by pressing on the middle of the centering means via at least three small studs or balls of flexible elastomer, bonded to the bottom of corresponding seats, whose rim is flared to permit the said studs to be pressed flat when the DVD or CD is snapped onto the shoulder of the centering means. Alternatively, ejection of the DVD can be achieved by means of at least three integrally molded prongs or, for example, metal prongs engaged in a groove and bonded in place.

According to an eighteenth version of the CD cases, they are stocked in boxes that permit storage in upright or slightly inclined orientation, the shape of their section corresponds to that of the cases, preferably octagonal, in that it comprises two half parts, of which the lower is opaque or translucent and the upper is transparent, equipped with additional means for snapping onto one another, and whose ends are closed and, for snapping onto other boxes, are provided on the outside with male means on one side and female means on the other.

The cases can be inclined by about 15°, either by providing play between the exterior of the cases and the interior of the box, or by modifying the angle of the lower edges.

According to a nineteenth version of the CD cases, they have the form of thin and flexible storage trays, for two, four or eight CDs, made of transparent plastic material, provided with oppositely disposed heat-sealed top and bottom spacer plates, with which they can be heat-sealed as a package and, beyond a space that permits bending for browsing purposes, provided with longitudinal and transverse top and bottom stiffening plates that define the positions of the CDs, which are each snapped onto oppositely disposed heat-sealed centering means, the centering means being provided with a thin wall bordered along its periphery by a slightly conical snap-on bearing surface whose diameter permits light clamping on the central hole of the CDs and with a small introductory chamfer, milled portions making the teeth elastically deformable to facilitate snap-on action, their heat-sealing to the tray being effected on the central part.

According to a twentieth version of the CD cases, the storage trays are heat-sealed as a package onto their spacer plates and in an organizer of thermoplastic material comprising a base having a thickness of 1.5 to at least 2 mm, a back integral with the base via an integrally molded hinge, a cover integral with the back (142) via a second hinge; it is closed by a front part joined to the base via another integrally molded hinge; a strip of sturdy fabric, bonded to the front part, is provided at its free end with a strip of "scratch" material, which can be fixed securely to another "scratch" strip by pressing the cover against the upper tray.

The advantages of the inventive cases compared with existing cases are the following:

very great simplification of manufacture;
very great simplification and speed of handling, access to the CD such that it can be removed with one hand by virtue of the absence of a cover in most models; this removal is achieved by light pressure on the centering means and periphery of the case;
inexpensive to manufacture—a single piece for all cases without covers;
extremely sturdy, unbreakable;
very light, even with several CDs; can be mailed in a normal envelope at very low cost;
very small space requirement in thickness—2.5 to 3 mm for 1 CD and 8 mm for four CDs, in contrast to 24 mm for 3 CDs in the traditional boxes;
in preferably octagonal shape it can be positioned in upright orientation;
it can be stacked and is provided with a small nesting flange or shoulder to prevent any lateral slippage in a stack;
because of the absence of a cover, the inscriptions on the CD are directly accessible and, since the other side is translucent, a label containing written information about the contents of the CD can be read, easy and secure organization on thin and flexible trays equipped with centering means that maintain their position while different pages are being browsed;

storage in very simple boxes that do not require much space and can be stacked end-to-end in upright or horizontal orientation.

The invention is described in detail in the text provided hereinafter with regard to the attached drawings, which are given by way of non-limitative examples and wherein:

FIG. 1 shows an example of the simplest non-stackable inventive case, viewed in section;

FIG. 2 shows an example of the simplest stackable inventive case, viewed in section;

FIGS. 3 and 4 show an example of a simple case that can house and fix in position a label, against which there is braced the CD to be housed and protected;

FIGS. 5 and 6 show examples of vertical, flat stacking of simple cases;

FIGS. 7 and 8 show an example of a case that houses two CDs such that they are centered by their outer periphery, with their recorded faces against one another;

FIGS. 9 and 10 show two examples of simplified cases comprising a simple centering means housing two CDs with their recorded faces against one another;

FIG. 11 shows a simplified case comprising a simple two-part centering means housing two CDs with their recorded faces against one another;

FIG. 22 shows an example of a CD centering means;

FIGS. 23A and 23B show examples of CD centering and ejection means, viewed in section;

FIGS. 24 to 26 show examples of CD centering means;

FIGS. 27 and 28 show an example of a CD storage box that can be placed flat or in upright orientation;

FIG. 29 shows an example, in section, of a tray for flat storage of 2, 4 or 8 CDs;

FIG. 30 shows an example, in section, of a CD centering means on trays for flat storage of CDs according to FIG. 29;

Figure 12:
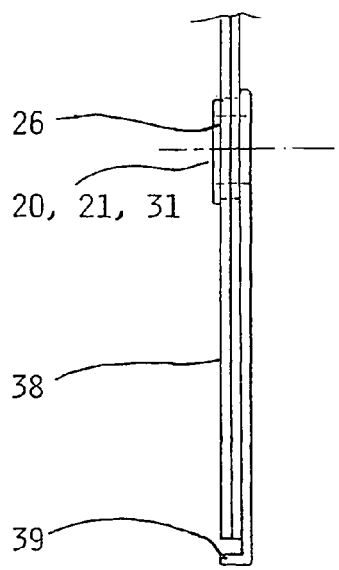
FIGS. 12 and 13 show any one of the cases of FIGS. 9 to 11 equipped with a support foot for storage in upright orientation.

FIG. 1 shows the simplest example of an inventive non-stackable case, viewed in section. It has a thin wall 1 of square, hexagonal or octagonal shape, slightly larger than the diameter 2 of CD D to be housed on a centering means C, the recorded face being braced against wall 1 which protects it, a cover being considered to be superfluous, since the non-recorded face is not fragile.

FIG. 2 shows, in section, the simplest example of an inventive case that is vertically stackable, on a shoulder 3 whose inner periphery leaves a slight space relative to diameter 2 of the CD and whose external shape 4 is square, hexagonal or octagonal.

FIGS. 3 and 4 show an example of a simple case that is also able to house and fix in position a label E containing additional information about the CD, visible through transparent wall 1, against which the recorded face of CD D to be housed and protected is braced by means of a conical internal face 5, which retains the periphery of the label by the base of the cone, the exterior 6 of the case being of square, hexagonal or preferably octagonal shape. These cases are preferably made of relatively flexible, transparent plastic material. Unsnapping is achieved by pressing the thumb on the middle of the centering means and simultaneously applying a flexing action with the fingertips on the rear side of the periphery of the case.

FIGS. 5 and 6 show examples of flat vertical stacking of simple cases according to FIGS. 3 and 4, by virtue of a shoulder 8 or of a flange 9 engaged in the top region 10 of conical face 5.

FIGS. 7 and 8 show an example of a simplified case 14 for housing two CDs 15, 16 with recorded faces against one another, with or without intermediate tray, centered and fixed in position by their exterior on a case whose outer shape 6 is square, hexagonal or octagonal. This case is not provided with a wall for protecting the CDs, since the recorded faces thereof are braced against one another and thus mutually protect one another. The CDs are fixed in position on this case by forcing them elastically over a very small snap-on projection 17 or 18 depending on the side of introduction (right part of the section). At the left part of the section there is shown a stop shoulder 19 that cooperates with projection 17. The partial diagram in FIG. 8 shows that retaining projections 17 and 18 can be divided into a plurality of parts to facilitate snapping on of the CDs.

FIGS. 9 and 10 show two examples of simplified cases comprising a simple centering means 20 (FIG. 9) and 21 (FIG. 10) for housing two CDs 22, 23 with their recorded faces against one another, with or without intermediate tray. As for the cases of FIG. 7, the CDs are snapped on by being forced over a projection 24 or 25, which can be divided up for easier snap-on action. Both case 20 and case 21 have a central hole 26 for weight reduction. In FIG. 10, snap-on projection 24 is replaced by a shoulder 27, against which CD 22 is braced.

FIG. 11 shows another example of a simplified case 30 comprising a simple two-part centering means 31, 32 for housing two CDs 22, 23 with their recorded faces against one another. Centering means 31 cooperates with an annular piece 33 via additional snap-on means 34, 35 for retaining the CDs, which are precisely engaged on the centering means with very slight play.

Figure 13:
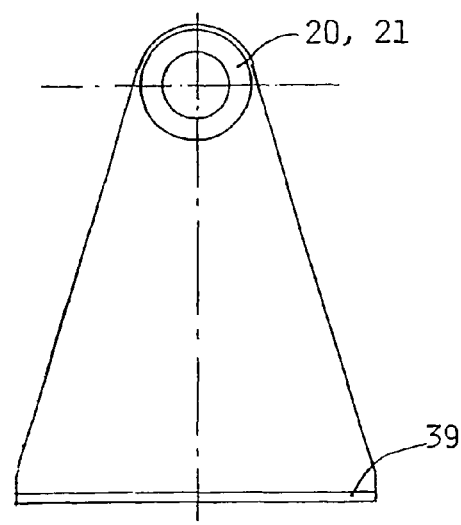

FIGS. 12 and 13 show any one of the cases of FIGS. 9 to 11 equipped with a Support foot 38, for designed storage in upright orientation and provided with a bracing base 39 having the width of one edge of the octagon of FIG. 3.

Figure 14:
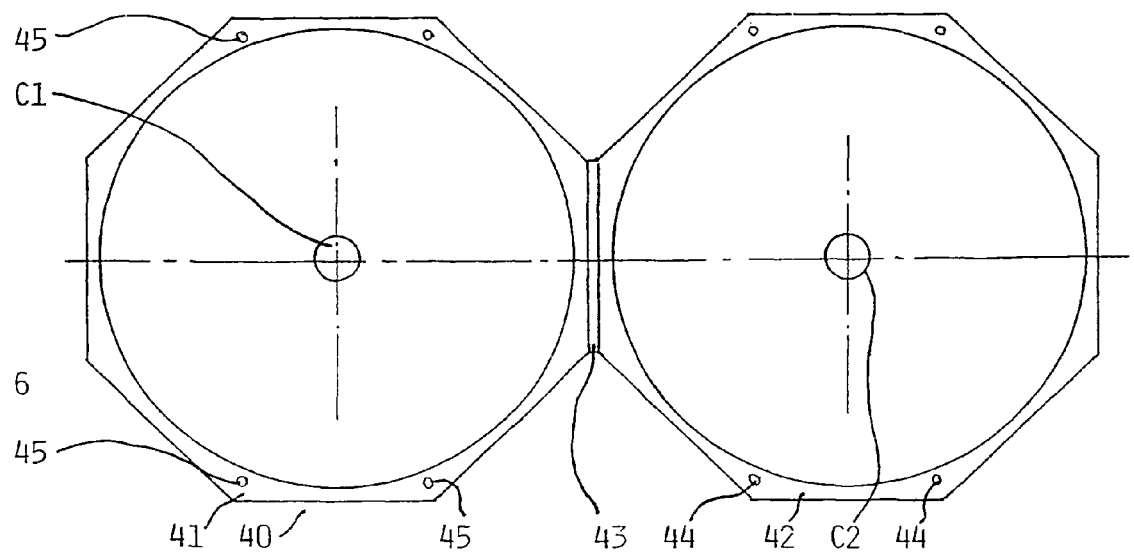
FIGS. 14 and 15 show an example of an open double case viewed from above and in section.
Figure 15:
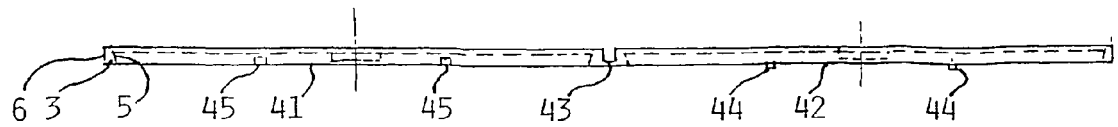
Figure 16:
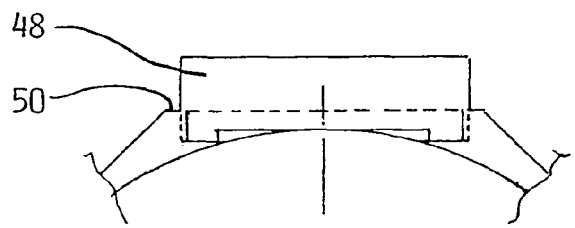
FIGS. 16, 17, 17A and 17B show examples of identification of the CDs.

FIGS. 14 and 15 show an example of an open double case 40 viewed from above (FIG. 14) and in section (FIG. 15). The two parts 41, 42 of the case, having octagonal outer shape 6 and each housing a CD snapped onto its centering means C, are joined together along one of their edges by an integrally molded hinge 43, which makes it possible to close them by means of pegs 44 cooperating with snap-in holes 45.

Figure 17A:
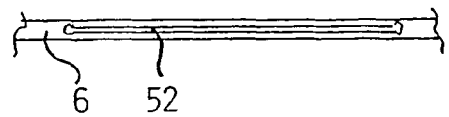
Figure 17:
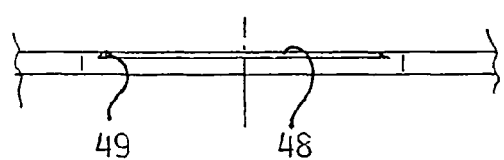
Figure 17B:
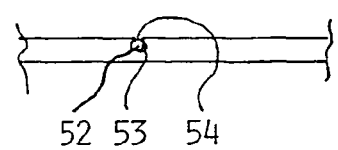

FIGS. 16, 17, 17A and 17B show examples of marking of the CDs. A thin label 48 of plastic material is engaged in a groove 49 cut into the side of one of the edges 50 of the case for the purpose of organization in upright orientation. This label can contain personalized organizational information. FIGS. 17A and 17B show an additional example of identification by CD family, comprising rods 52 of one, two or three colors, engaged in a hole 53 sunk partly into the side 54 of face 6 of an edge of the case.

Figure 18:
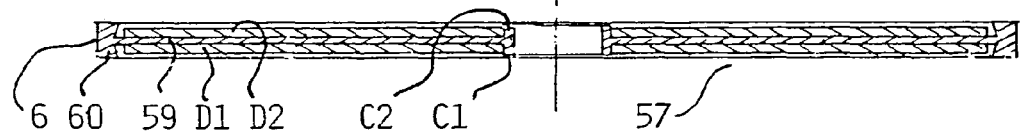
FIGS. 18 and 19 show examples of simple cases for housing two and four CDs.
Figure 19:
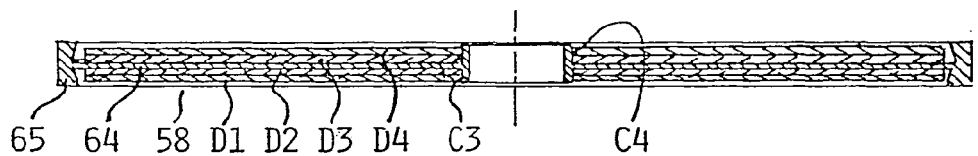

FIGS. 18 and 19 show examples of simple cases 57 and 58 for housing two and four CDs. FIG. 18 shows an example of a case 57 designed to house one CD D1 and one CD D2 on each side of its wall 59, each snapped onto a corresponding centering means C1, C2. It is provided with a double shoulder 60, which does not have to be conical if labels are not used because they will not be visible. If one label is used per CD, it contains additional information on the contents of the CD, the main information contained on the non-recorded faces being outwardly visible. FIG. 19 shows an example of a simple case 58 housing, on each side of its wall 64, two CDs, whose recorded faces are braced against one another with or without interposed label. Their centering means C3, C4 are slightly longer than centering means C1, C2, so that two CDs can be snapped on simultaneously. They are unsnapped in the same way as for the other cases. The thickness of double shoulder 65 is the same as that of the centering means, thus allowing them to be stored in upright orientation or stacked vertically.

Figure 20:
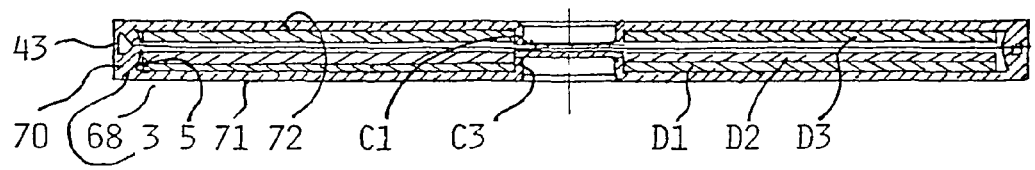
FIGS. 20 and 21 show examples of double cases for housing three or four CDs.
Figure 21:
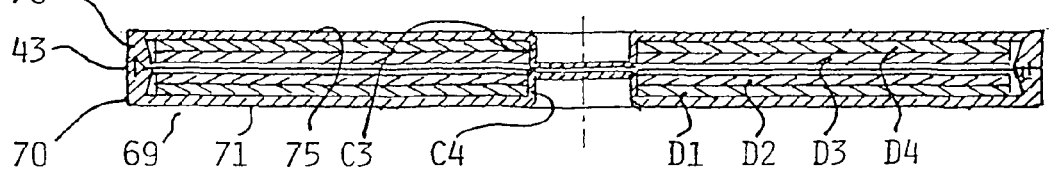

FIGS. 20 and 21 show examples of double cases 68, 69 for housing three or four CDs. These cases are analogous to those of FIGS. 14 and 15. FIG. 20 shows an example of a double case with three CDs D1, D2 and D3, wherein two (D1, D2) are on the left part 71 and one (D3) is on the right part 72. Shoulder 70 of left part 71 has greater thickness, which is slightly larger than that of centering means C3 for housing two CDs as well as that of right part 72, which houses only one CD. The two parts 71 are pivoted on an integrally molded flexible hinge 43. Part 72 can house a label against its wall, and part 71 can house an intermediate member between the two CDs. The non-recorded faces of the three CDs are visible, one outwardly and the two others when the case is opened.

FIG. 21 shows a double case 69 with two symmetric parts 71, 75, each housing two CDs D1, D2 and D3, D4 with recorded faces against one another, the four non-recorded faces bearing information being visible outside through transparency and inside when the case is opened.

FIGS. 22 to 26 show examples of CD centering means viewed in section. FIG. 22 shows an example of centering means 78. The thickness 79 of the bracing wall for the recorded face of the CD or DVD is reduced by at least half 80 at the centering means, in order to make it elastically deformable. Snap-on shoulder 81 is slightly conical, so that it can deform elastically when a CD is inserted. When the middle of the centering means is pressed in the direction of arrow 82, the wall deforms as shown by dotted lines 83, with the effect of reducing the diameter of shoulder 81. If an inverse flexing action is simultaneously produced on the outside of the case, the CD is released from its centering means. Second centering means 84, identical to the first, is attached by heat sealing opposite the first at 85.

FIGS. 23A and 23B show an example of a case with centering-and-ejection means designed mainly to house a laser disk of the DVD type. It is provided with the same centering means as that of FIG. 22, to which there is added elastically deformable ejection means intended to lift the CD when the middle of the centering means is pressed. This ejection can be achieved in several ways, either by means of three small studs 85 of flexible elastomer, bonded to the bottom of corresponding seats 86, whose rim is flared to permit the said studs to be pressed flat when the DVD or CD is snapped onto shoulder 81 of the centering means. The free end of studs 85 is hemispherical and of the same height as that of the centering means, either by replacing studs 85 by elastomeric balls B (FIG. 23B) adhered onto corresponding indentations; or else by means of at least three integrally molded prongs (right side of FIGS. 23A and 23B) or, for example, metal prongs L engaged in a groove and bonded (FIG. 23B). By pressing on middle 82 of the centering means while the case is placed flat on a table, studs 85, the balls or prongs 87 lift up and release the DVD from its centering means.

FIG. 24 shows another example of centering means 88 for housing two CDs D1, D2 with their recorded faces against one another. Its shape is similar to that of the centering means of FIG. 22, but it is higher so that it can house and retain two CDs instead of one, while cone 89 has a slightly smaller slope. The two CDs are unsnapped in the same way as on FIG. 22. To house one or two additional CDs on the other face of wall 1, a centering means 90 for one or two CDs is heat-sealed opposite the first.

FIG. 25 shows another example of centering means 92 for one CD; it is made flexible by dividing up surface 93 of the snap-on cone by openings 94, while leaving a center 95 on which the unsnapping pressure is exerted. To house 2 CDs, the height of the centering means is increased by the thickness of one CD. As for the other models of centering means, a second centering means can be heat-sealed to the other face of the case.

FIG. 26 shows another example of centering means 98 on shoulder 99, to which there is attached by bonding a ring 100 of elastomer with a diameter very slightly larger than that of the central hole of the CDs, in order to create a slight retaining pressure thereon. Ejection is achieved by pushing on the rear of the bracing face of the CD, through holes 101.

FIGS. 27 and 28 show an example of a box for storage of CDs in upright or slightly inclined orientation. These boxes can be placed flat or in upright orientation. The shape of the section of the box corresponds to that of the cases, preferably octagonal. It comprises two half parts, lower part 110 being opaque or translucent and upper part 111 being transparent. The two half parts 110, 111 are equipped with additional means 112 for snapping onto one another. The two ends of the two half parts are closed and, for snapping onto other boxes, are provided on the outside with male means 113 on one side and female means 114 on the other side. To ensure that the CDs can be browsed visually in the absence of markings, it is possible to incline the cases by about 15°, either by allowing play between the outside of the cases and the inside of the box, or by slightly increasing the angle 115, 116 of the edges.

FIGS. 29 and 30 show a section in elevation viewed from above of an example of a thin and flexible tray for flat storage of 2, 4 or 8 CDs. This tray 118, of transparent plastic material, is provided with oppositely disposed heat-sealed top and bottom spacer plates 120, 121, with which the said trays can be heat-sealed as a package (FIG. 31), a space 119 that permits bending for browsing and heat-sealed top and bottom stiffening plates disposed longitudinally 123, 124, 125 and transversely 126, 127, 128, defining the CD positions. As shown in section in FIG. 30, each CD is snapped onto a centering means 130, heat-sealed in opposite position above and below the tray. It is provided with a thin wall 131 bordered at its periphery by a slightly conical snap-on bearing surface 132 having a diameter that permits sufficient clamping effect for retention on the central hole of the CDs and with a small introductory chamfer 133. Milled portions 134 make the teeth 135 elastically deformable to facilitate snap-on action. Heat-sealing to the tray is performed exclusively on central part 136, in order to conserve the flexibility of the snap-on teeth.

Figure 31:
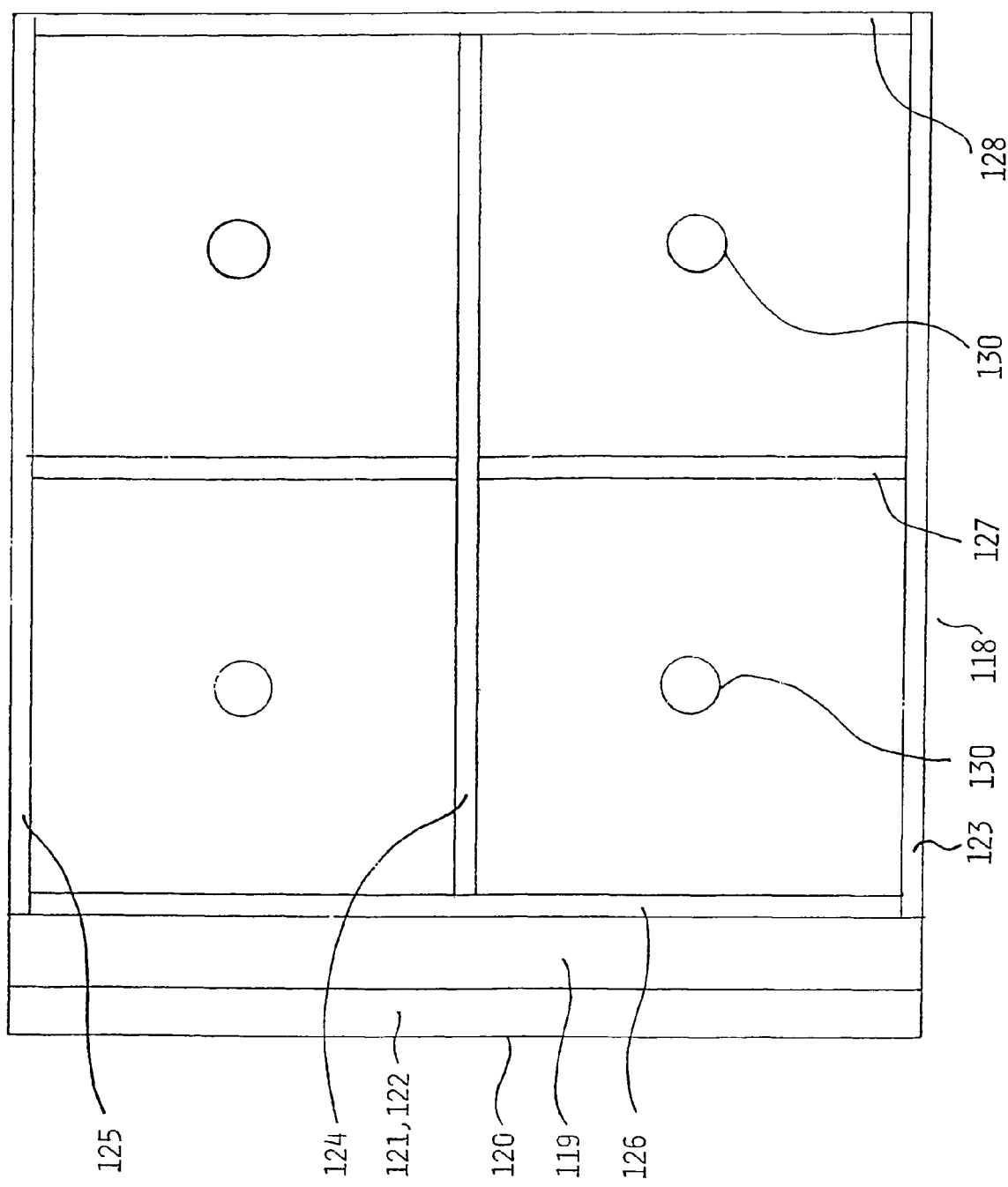
FIG. 31 shows an example, viewed from above, of the tray for flat storage of CDs according to FIG. 29.
Figure 32:
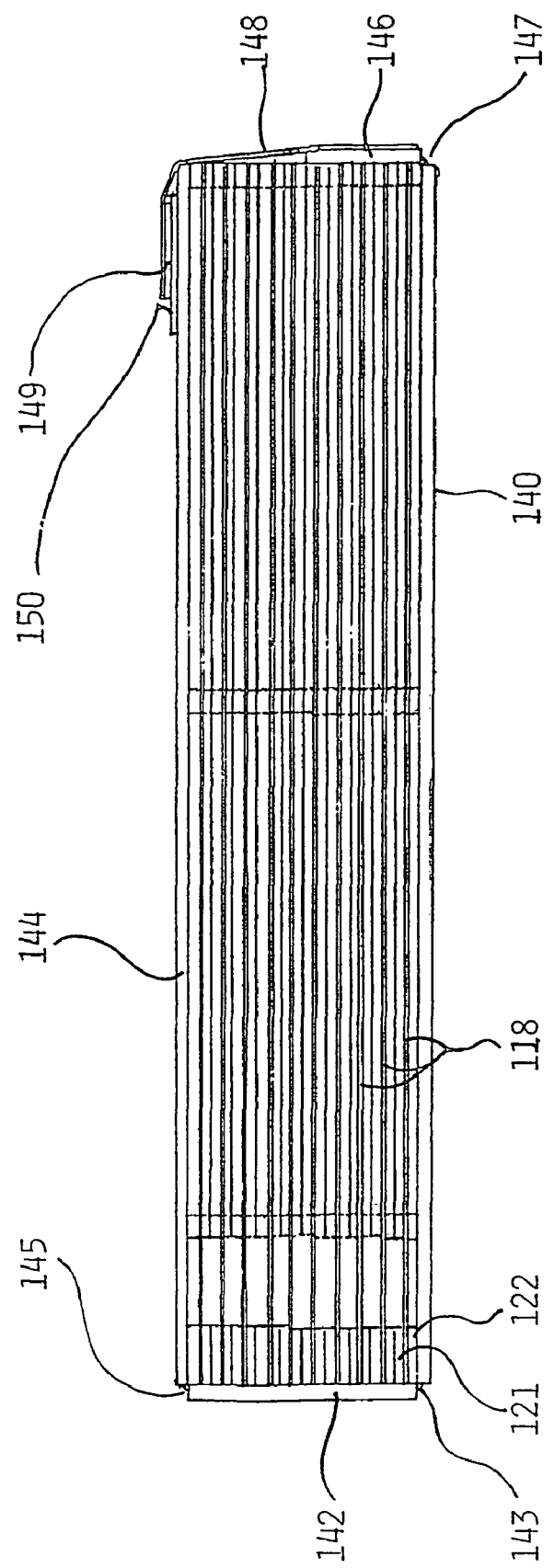
FIG. 32 shows an example of trays for flat storage, heat-sealed together as a package on an organizer.

FIG. 31 shows an example of flat storage trays 118 heat-sealed as a package on an organizer 140 of thermoplastic material comprising a base 141 with a thickness of 1.5 to at least 2 mm, a back 142 integral with the base via an integrally molded hinge 143, and a cover 144 integral with back 142 via a second hinge 145. The organizer is closed by a front part 146 joined to the base by another integrally molded hinge 147. A strip 148 of sturdy fabric, bonded to front part 146, is provided at its free end with a strip 149 of "scratch" material, which can be fixed securely to another "scratch" strip 150 by pressing cover 144 against top tray 118, thus shielding the collection of CDs from dust. The organizer of plastic material can be covered by decorative fabric.

What is claimed is:

1. A plurality of cases configured to hold one or more laser disks having opposing faces and opposing inner and outer annular edges, each of the cases comprising:
    a first wall including a first surface configured to contact the recorded face of a first laser disk when secured;
    a first centering unit configured to secure the first laser disk by engaging the inside annular edge of the first laser disk; and
    a first peripheral shoulder having a polygonal shape and configured to surround the laser disk when secured,
    wherein the cases are configured to be stacked and the top case thereof does not require a cover to protect the recorded face of the respective laser disk.

2. The plurality of cases according to claim 1, wherein the first peripheral shoulder includes a conical bearing surface or a bearing surface having one or more pins,
    the conical surface and the one or more pins are configured to engage a second peripheral shoulder of another case, and the conical surface and the one or more pins are configured to disengage from the second peripheral shoulder by pressing a thumb on a middle of the centering unit and simultaneously applying a flexing action to the first peripheral shoulder.

3. The plurality of cases according to claim 1, configured to be made in a stack by a bearing surface or a flange engaging a conical surface of a preceding case and preventing the case and preceding case from slipping laterally with respect to one another.

4. The plurality of cases according to claim 1, further comprising: a second surface of the wall opposing the first surface and configured to contact one face of a second laser disk when secured; a second centering unit configured to secure the second laser disk against the second surface of the wall by engaging the inside annular edge of the second laser disk; and a second peripheral shoulder having a polygonal shape and surrounding the second laser disk when secured.

5. The plurality of cases according to claim 1, wherein the centering unit forms an elastically deformable, annular fixation hub provided either with two retaining projections or with one projection, one stop, and a central hole.

6. Case according to claim 5, wherein the annular fixation hub is attached to an upright support foot configured to store the first and second laser disks in an upright orientation when secured.

7. The plurality of cases according to claim 1, wherein the centering unit forms an elastically deformable, annular fixation hub, comprising two parts snapped together by a snap-on magnet.

8. The plurality of cases according to claim 1, further comprising:
    an identification label comprised of plastic material and engaged in a groove cut in a side of an edge of the case; and
    rods of one, two, or three colors, engaged in a hole sunk partly into a side of a face of the edge of the case.

9. The plurality of cases according to claim 1, wherein the first centering unit is configured to secure two laser disks with respective faces abutting against one another, and
    the centering unit has a conical shape, and is longer than a thickness of the two CDs, and
    a thickness of a portion of the first wall decreases as proximity to the centering unit increases.

10. The plurality of cases according to claim 1, wherein the centering unit includes an elastomeric ring having a diameter slightly larger than that of the inner annular edge of the first laser disk and configured to create a retaining pressure on the first laser disk when secured, and
    wherein ejection is achieved by pushing, though holes in the wall, on the one face of the first laser disk.

11. The plurality of cases according to claim 1, further comprising:
    an ejection unit comprising at least one stud of flexible elastomer, bonded to a bottom of a corresponding seat, whose rim is flared to permit the at least one stud to be pressed flat when the first laser disk is secured to the first centering unit, and
    wherein a free end of the at least one stud is hemispherical and of a same height as that of the centering unit.

12. The plurality of cases according to claim 1, wherein ejection of the first laser disk from the centering unit is aided by at least one ball of elastomer adhered onto corresponding indentation of the first surface of the first wall.

13. Case The plurality of cases according to claim 1, wherein ejection of the first laser disk from the centering unit is aided by at least one metal prong arranged in a corresponding groove of the first surface of the first wall.

14. The plurality of cases according to claim 1, wherein a second centering unit is attached, by heat sealing, to a second surface of the first wall in a position opposite to the first centering unit.

15. A storage box configured to store, in an upright or slightly inclined orientation, the plurality of cases according to claim 1, and having a shape of section corresponding to that of an outer shape each of the cases, the storage box comprising:
    a lower half part which is opaque or translucent;
    an upper half part which is transparent;
    means for snapping the lower and upper parts onto one another;
    closed ends configured to snap onto another storage box, the closed ends being provided on an outside with a male securing unit on a first side and a female securing unit on a second side;
    wherein the storage case can be inclined by about 15°.

16. A double case configured to house at least two laser disks each having opposing faces and opposing inner and outer annular edges, comprising:
    a first case including a first wall having a first surface configured to contact one face of a first laser disk when secured, a first centering unit configured to secure the first laser disk by engaging the inside annular edge of the first laser disk, and a first peripheral shoulder having a polygonal shape and surrounding the first laser disk when secured;
    a second case including a second wall having a second surface configured to contact one face of a second laser disk when secured, a second centering unit configured to secure the second laser disk against the second surface of the second wall by engaging the inside annular edge of the second laser disk, and a second peripheral shoulder having a polygonal shape and surrounding the second laser disk when secured;

a flexible joint integrally molded on and joining respective edges of the first and second peripheral shoulders; and a molded closure configured to securely fasten the first and second peripheral shoulders with the first and second centering units.

17. Case according to claim 16, wherein the first centering unit is configured to secure two laser disks, the second centering unit is configured to secure one laser disk, and the case is configured to house three laser disks and a booklet when closed.

18. Case according to claim 16, wherein the first and second centering units are each configured to secure two laser disks.

19. A thin and flexible storage tray, for two, four, or eight laser disks, comprising:

a thin and flexible plastic sheet;

oppositely disposed heat-sealed top and bottom spacer plates, with which multiple storage trays can be uniformly stacked and heat-sealed as a package;

a space that permits bending for browsing purpose;

heat-sealed top and bottom stiffening plates, disposed longitudinally and transversely, defining positions of the laser disks; and oppositely disposed heat-sealed centering units each having a conical snap-on bearing surface including a small introductory chamfer and milled portions which facilitate securing of the disks to the storage tray.

20. Storage tray according to claim 19, wherein the storage tray is heat-sealed as a package onto top and bottom spacer plates.

21. Storage tray according to claim 19, wherein the storage tray is heat-sealed as a package in an organizer of thermoplastic material comprising a base having a thickness of 1.5 to at least 2 mm, a back integral with the base by an integrally molded hinge, and a cover integral with the base by a second flexible hinge.

22. A case configured to hold one or more laser disks each having opposing faces and opposing inner and outer annular edges, the case comprising:

a wall including a surface configured to contact substantially all of one face of a laser disk when secured;

a centering unit configured to secure the laser disk by engaging the inside annular edge of the laser disk; and a peripheral shoulder having a polygonal shape and configured to surround the laser disk when secured.

* * * * *